US012665781B2

(12) United States Patent
Makitani et al.

(10) Patent No.: US 12,665,781 B2
(45) Date of Patent: Jun. 23, 2026

(54) POWER SUPPLY SYSTEM AND POWER SUPPLY UNIT

(71) Applicant: Sansha Electric Manufacturing Co., Ltd., Osaka (JP)

(72) Inventors: Atsushi Makitani, Osaka (JP); Taro Uenoyama, Osaka (JP)

(73) Assignee: SANSHA ELECTRIC MANUFACTURING CO., LTD., Osaka (JP)

( * ) Notice: Subject to any disclaimer, the term of this patent is extended or adjusted under 35 U.S.C. 154(b) by 374 days.

(21) Appl. No.: 18/039,971

(22) PCT Filed: Jan. 27, 2021

(86) PCT No.: PCT/JP2021/002747

§ 371 (c)(1),
(2) Date: Jun. 2, 2023

(87) PCT Pub. No.: WO2022/162763

PCT Pub. Date: Aug. 4, 2022

(65) Prior Publication Data

US 2024/0007327 A1 Jan. 4, 2024

(51) Int. Cl.
*H04L 12/40* (2006.01)

(52) U.S. Cl.
CPC ............................. *H04L 12/40045* (2013.01)

(58) Field of Classification Search
CPC ...................................................... H02J 1/102
See application file for complete search history.

(56) References Cited

U.S. PATENT DOCUMENTS 5,768,117 A * 6/1998 Takahashi ............... H02J 1/102
                                                    363/78
7,423,354 B2 * 9/2008 Suzuki ................. G11B 33/126
(Continued)

FOREIGN PATENT DOCUMENTS

CN        106230063 A      12/2016
CN        209963757 U       1/2020
(Continued)

OTHER PUBLICATIONS

International Search Report and Written Opinion issued in corresponding International Patent Application No. PCT/JP2021/002747 (with English translation of International Search Report) mailed Apr. 13, 2021 (10 pages).

(Continued)

*Primary Examiner* — Guang W Li
(74) *Attorney, Agent, or Firm* — Kilyk & Bowersox, P.L.L.C.

(57) ABSTRACT

Provided is a power supply system in which two or more power supply units are optionally connected and used in any operation mode. The present invention includes a power supply main circuit 30 that converts AC power 21 into DC power; a current detection unit 302 that detects an output current Io; a voltage detection unit 301 that detects an output voltage Vo; a parameter storage unit 34 that rewritably holds, as a target value Cr, operation mode information Cm selectively indicating constant current operation or constant voltage operation, and one of a target current Iref and a target voltage Vref corresponding to the operation mode information Cm; a control unit 36 that controls the power supply main circuit 30 such that one of the output current Io and the output voltage Vo corresponding to operation mode information Cm matches the target value Cr; a balance information transmission unit 32 that transmits the other of the output current Io and the output voltage Vo as balance (Continued)

information Bi; and a balance information reception unit 32 that receives, as balance information Bi, the other of the output current Io and the output voltage Vo from another one of the power supply units, in which the control unit 36 controls the power supply main circuit 30 based on balance information Bi of the own unit and of the another power supply unit and performs balance adjustment with the another power supply unit.

5 Claims, 15 Drawing Sheets

(56)                          References Cited

U.S. PATENT DOCUMENTS

| | | | | |
|---|---|---|---|---|
| 7,466,038 | B2 * | 12/2008 | Gaudreau | H02J 1/001 |
| | | | | 307/82 |
| 7,502,240 | B2 * | 3/2009 | Leung | H03K 3/356121 |
| | | | | 363/72 |
| 7,557,461 | B2 * | 7/2009 | Kawakubo | G06F 1/30 |
| | | | | 307/130 |
| 7,724,552 | B2 * | 5/2010 | Itakura | H02J 1/102 |
| | | | | 363/65 |
| 7,999,410 | B2 * | 8/2011 | Hartung | H02J 1/001 |
| | | | | 307/65 |
| 8,890,535 | B2 * | 11/2014 | Wong | G01R 31/40 |
| | | | | 363/35 |
| 9,325,244 | B2 * | 4/2016 | Machi | H02M 3/285 |
| 9,705,325 | B2 * | 7/2017 | Dwelley | H02J 1/102 |
| 9,712,080 | B2 * | 7/2017 | Phadke | H02J 1/102 |
| 10,038,318 | B2 * | 7/2018 | Price | H02J 1/14 |
| 10,074,981 | B2 * | 9/2018 | Faley | H02J 3/381 |
| 10,381,867 | B1 * | 8/2019 | Le | H02M 1/10 |
| 10,635,122 | B2 * | 4/2020 | Le | G05F 1/14 |
| 11,309,832 | B2 * | 4/2022 | Adest | H10F 77/955 |
| 11,601,007 | B2 * | 3/2023 | Suzuki | H02J 7/0013 |
| 2010/0013306 | A1 * | 1/2010 | Heineman | H02J 1/001 |
| | | | | 307/32 |
| 2010/0325447 | A1 * | 12/2010 | Rui | H02M 3/1584 |
| | | | | 713/300 |
| 2012/0256659 | A1 * | 10/2012 | Kiadeh | H02M 3/1584 |
| | | | | 327/108 |
| 2014/0160814 | A1 * | 6/2014 | Morimoto | H02M 3/1584 |
| | | | | 363/65 |
| 2016/0006242 | A1 * | 1/2016 | Yamada | H02J 7/34 |
| | | | | 307/65 |
| 2016/0276844 | A1 * | 9/2016 | Gekinozu | H02J 1/102 |
| 2017/0170714 | A1 | 6/2017 | Nguyen et al. | |
| 2020/0122265 | A1 | 4/2020 | Kawai et al. | |
| 2021/0028686 | A1 | 1/2021 | Jiang et al. | |
| 2021/0135478 | A1 * | 5/2021 | Schline | G06F 1/263 |

FOREIGN PATENT DOCUMENTS

| | | | |
|---|---|---|---|
| EP | 0660487 | A2 | 6/1995 |
| JP | H0158247 | U | 4/1989 |
| JP | H1094174 | A | 4/1998 |
| JP | 2004080869 | A | 3/2004 |
| JP | 2006304419 | A | 11/2006 |
| JP | 2009142028 | A | 6/2009 |
| JP | 2009148032 | A | 7/2009 |
| JP | 2012060692 | A | 3/2012 |
| JP | 2014043098 | A | 3/2014 |
| JP | 2014147196 | A | 8/2014 |
| JP | 2017127119 | A | 7/2017 |
| JP | 2017127195 | A | 7/2017 |
| WO | 2013136475 | A1 | 9/2013 |
| WO | 2022162764 | A1 | 8/2022 |
| WO | 2022162765 | A1 | 8/2022 |

OTHER PUBLICATIONS

Extended European Search Report issued in corresponding European Patent Application No. 21922787.3 dated Oct. 9, 2024 (8 pages).
Office Action issued in corresponding Chinese Patent Application 202180051214.X issued Jan. 6, 2026 (14 pages).

* cited by examiner

NECESSITY OF BALANCE ADJUSTMENT

|  | PARALLEL CONNECTION | SERIES CONNECTION |
|---|---|---|
| CONSTANT CURRENT OPERATION CC | UN—NECESSARY (PARALLEL CC) | NECESSARY (SERIES CC) |
| CONSTANT VOLTAGE OPERATION CV | NECESSARY (PARALLEL CV) | UN—NECESSARY (SERIES CV) |

*FIG. 3*

(a) UNIT CONFIGURATION OF PARALLEL CC (b) CONTROL PROCESSING OF PARALLEL CC (a) UNIT CONFIGURATION OF SERIES CC (b) CONTROL PROCESSING OF SERIES CC (a) UNIT CONFIGURATION OF SERIES CV (b) CONTROL PROCESSING OF SERIES CV (a) UNIT CONFIGURATION OF PARALLEL CV (b) CONTROL PROCESSING OF PARALLEL CV

UNIT CONFIGURATION OF SERIES-PARALLEL CC

WITHIN SERIES CIRCUIT:      SERIES CC
BETWEEN SERIES CIRCUITS:  PARALLEL CC

UNIT CONFIGURATION OF SERIES-PARALLEL CV

WITHIN SERIES CIRCUIT:          SERIES CV
BETWEEN SERIES CIRCUITS:   PARALLEL CV (a) TRANSMISSION SIGNAL (UID=0)

(b) TRANSMISSION SIGNAL (UID=1)

(c) TRANSMISSION SIGNAL (UID=2)

(d) TRANSMISSION SIGNAL (UID=3)

(e) DRIVE SIGNAL (UID=0-3)

POWER SUPPLY SYSTEM AND POWER SUPPLY UNIT

This application is a National Stage Application of PCT/JP2021/02747, filed Jan. 27, 2021.

TECHNICAL FIELD

The present invention relates to a power supply system and a power supply unit, and more particularly to a power supply system that includes two or more optionally connected power supply units and in which the power supply units cooperate to supply DC power to a shared load.

BACKGROUND ART

A power supply system that includes two or more power supply units and that supplies DC power from each power supply unit to a common load is known (for example, Patent Literature 1 and 2). In this type of power supply system, a power supply apparatus having various characteristics can be realized by connecting two or more power supply units. For example, in an operation test of an electric vehicle or a power conditioner, or the like, such a power supply system is used as a simulated power supply that simulates a battery, a solar panel, or the like.

In a power supply system in which two or more power supply units are connected, it is known that a load balance between the power supply units may be lost. Therefore, in this type of power supply system, it is necessary to adjust the balance between the power supply units.

The power supply system of Patent Literature 1 is a fixed voltage source configured by connecting three power supply units in parallel. In each power supply unit, feedback control of the output voltage is performed. The balance is adjusted by correcting the voltage control in each power supply unit by using the average output current of all the power supply units.

The power supply system of Patent Literature 2 is a constant current source configured by connecting three power supply units in series, and one power supply unit operates as the master and the other power supply units operate as slaves. The master power supply unit performs feedback control of the output current, while the slave power supply units perform feedforward control based on the output voltage of the master.

CITATION LIST

Patent Literature 1: JP 2009-148032 A
Patent Literature 2: JP 2014-147196 A

SUMMARY OF INVENTION

Technical Problem

A conventional power supply system can be configured by connecting two or more power supply units. However, it is necessary to make the signal wiring between the power supply units different according to the way in which the power supply units are connected and the operation mode of the power supply system, and it is also necessary to make the methods of controlling the power supply units different. For this reason, a conventional power supply system has a problem that it is not easy to optionally connect two or more power supply units and use same in any operation mode. For example, there is a problem that a user having sufficient knowledge about balance adjustment between power supply units needs to perform necessary signal wiring between the power supply units as necessary and determine control processing for each power supply unit.

In addition, in a case where deviation in output start timing occurs between two or more power supply units, there is a problem that the operation at the start of the output becomes unstable. In particular, in a case where an output start command is transmitted between power supply units via digital communication, there is a problem that a non-negligible deviation in output start timing may occur.

Furthermore, there is a problem that, in a case where failure occurs in any one of the two or more power supply units during the output operation of the power supply system, the balance between the power supply units is lost, an excessive load is applied to the remaining power supply units, and there is a risk of damage to the power supply units.

The present invention was conceived in view of the above circumstances, and an object thereof is to provide a power supply system that enables two or more power supply units to be optionally connected and used in any operation mode. Another object of the present invention is to provide a power supply system that can be easily constructed by a user. Yet another object is to provide a power supply unit that is used for such a power supply system.

Solution to Problem

A power supply system according to a first embodiment of the present invention is a power supply system that includes two or more power supply units that can be optionally connected, that includes two or more power supply units, and in which the power supply units cooperate to supply DC power to a shared load. Each of the power supply units includes a power supply main circuit that converts AC power inputted from the outside into DC power; a current detection unit that detects an output current; a voltage detection unit that detects an output voltage; a parameter storage unit that rewritably holds, as a target value, operation mode information selectively indicating constant current operation or constant voltage operation, and one of a target current or a target voltage, whichever corresponds to the operation mode information; a control unit that controls the power supply main circuit such that one of the output current or the output voltage, whichever corresponds to the operation mode information, matches the target value; a balance information transmission unit that transmits the other of the output current and the output voltage as balance information; and a balance information reception unit that receives, as balance information, the other of the output current and the output voltage from another one of the power supply units, and the control unit controls the power supply main circuit based on balance information of the own unit and of the another power supply unit and performs balance adjustment with the another power supply unit.

By adopting the above configuration, two or more power supply units can be optionally connected in series, parallel, or series/parallel, and a desired power supply system can be easily realized by optionally designating constant current operation or constant voltage operation as the operation mode.

A power supply system according to a second embodiment of the present invention is configured such that, in addition to the above configuration, the parameter storage unit rewritably holds balance adjustment target information for identifying the another power supply unit serving as a reference target for balance adjustment, the balance information transmission unit transmits balance information on the own unit to an inter-unit communication line of the bus communication type, and the balance information reception unit selectively receives the balance information from the inter-unit communication line based on the balance adjustment target information.

By adopting the above configuration, balance adjustment can be performed by connecting two or more power supply units by an inter-unit communication line, and it is not necessary to perform special wiring for the balance adjustment. Therefore, the power supply system can be easily constructed. Furthermore, the unit configuration can be easily changed, or the operation mode can be easily changed.

A power supply system according to a third embodiment of the present invention is configured such that, in addition to the above configuration, another power supply unit connected in series to the own unit is set as a reference target for the balance adjustment during constant current operation, whereas, during constant voltage operation, another power supply unit connected in parallel to the own unit is set as the reference target for the balance adjustment.

By adopting the above configuration, the reference target of the balance adjustment can be determined according to the unit configuration and the operation mode.

A power supply system according to a fourth embodiment of the present invention is configured such that, in addition to the above configuration, the balance adjustment target information is generated by a control terminal based on a user operation and transmitted to the power supply units.

By adopting the above configuration, even a user who does not have sufficient knowledge about balance adjustment is able to easily realize a desired power supply system by optionally designating a unit configuration and an operation mode.

A power supply unit according to a fifth embodiment of the present invention is a power supply unit connected in series or in parallel with another power supply unit, the power supply unit cooperating with the another power supply unit to supply DC power to a shared load, the power supply unit including a power supply main circuit that converts AC power inputted from the outside into DC power; a current detection unit that detects an output current; a voltage detection unit that detects an output voltage; a parameter storage unit that rewritably holds, as a target value, operation mode information selectively indicating constant current operation or constant voltage operation, and one of a target current or a target voltage, whichever corresponds to the operation mode information; a control unit that controls the power supply main circuit such that one of the output current or the output voltage, whichever corresponds to the operation mode information, matches the target value; a balance information transmission unit that transmits the other of the output current and the output voltage as balance information; and a balance information reception unit that receives, as balance information, the other of the output current and the output voltage from another power supply unit, in which the control unit controls the power supply main circuit based on balance information of the own unit and of the another power supply unit and performs balance adjustment with the another power supply unit.

Advantageous Effects of Invention

With the present invention, it is possible to provide a power supply system that enables two or more power supply units to be optionally connected and used in any operation mode. In addition, it is possible to provide a power supply system that can be easily constructed by the user himself/ herself. Furthermore, a power supply unit used for such a power supply system can be provided.

BRIEF DESCRIPTION OF DRAWINGS

FIG. 3 is a table indicating whether or not balance adjustment is necessary.

DESCRIPTION OF EMBODIMENTS

First Embodiment (1) Outline of Power Supply System 100

Figure 1:
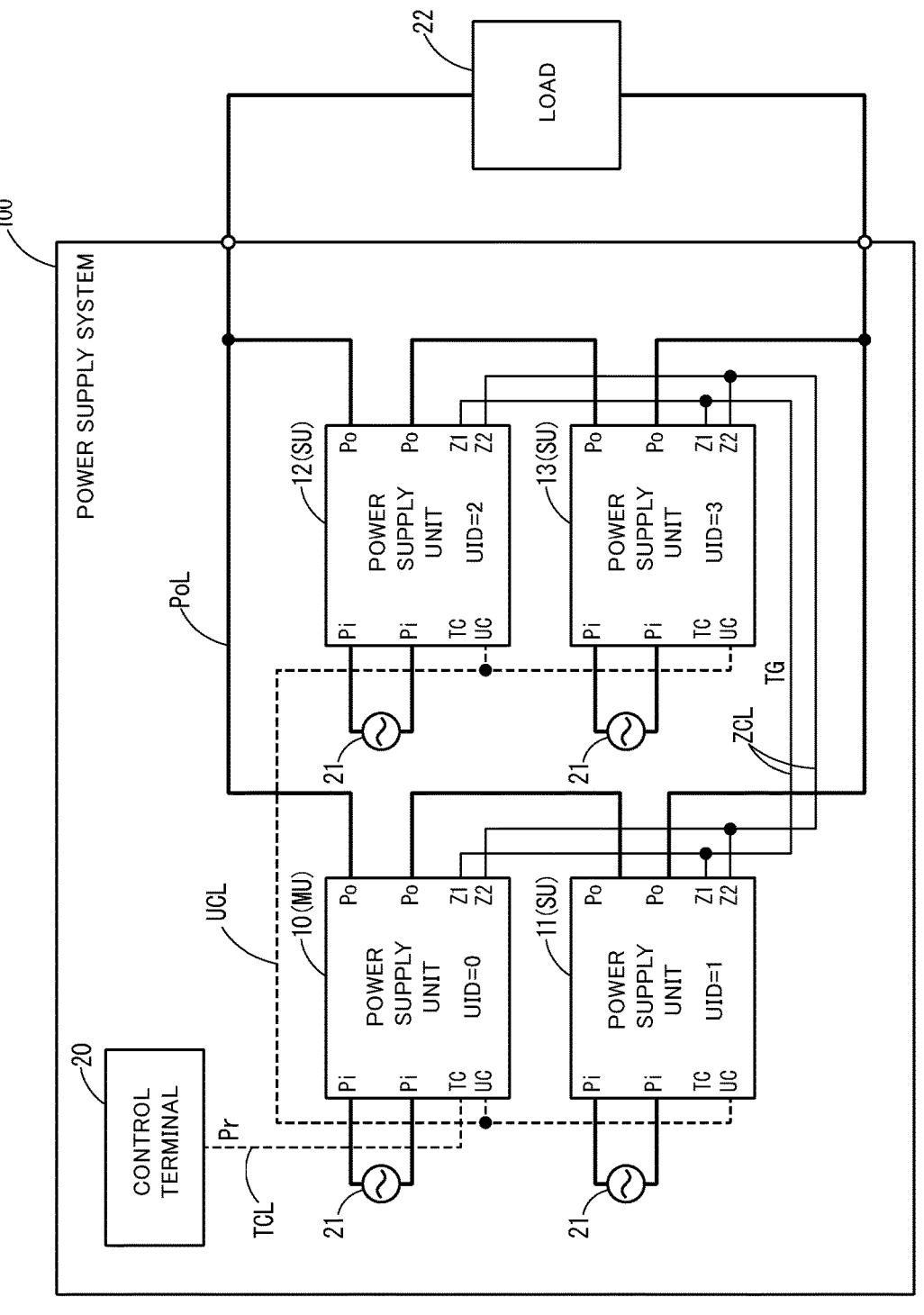
FIG. 1 is a diagram illustrating an example of a schematic configuration of a power supply system 100 according to a first embodiment of the present invention.

FIG. 1 is a diagram illustrating an example of a schematic configuration of a power supply system 100 according to a first embodiment of the present invention. The power supply system 100 is a power supply apparatus that converts AC power 21 supplied from the power grid into the desired DC power and supplies the DC power to a load 22.

The power supply system 100 includes two or more power supply units 10 to 13 connected to the load 22 via an output line PoL. Each of the power supply units 10 to 13 converts AC power supplied from the outside into DC power, based on a control parameter Pr from a control terminal 20, and supplies the DC power to the load 22. Furthermore, balance adjustment is performed between the power supply units 10 to 13 based on the control parameter Pr from the control terminal 20.

Each power supply unit 10 to 13 is a device with the same configuration, and is pre-associated with a unique identification number 0 to 3. The identification number is a unit identification information UID for the power supply units 10 to 13 to identify each other. The power supply units 10 to 13 are connected to each inter-unit communication line UCL, and communication is enabled between arbitrary power supply units 10 to 13 by using the unit identification information UID. Further, the power supply units 10 to 13 are connected to a pair of isolated communication lines ZCL, thus enabling the output start timing to be synchronized.

One of the power supply units 10 to 13 is determined beforehand to be the master unit MU, while the others are the slave units SU, and only the master unit MU is connected to the control terminal 20. For example, the power supply unit 10 associated with the smallest identification number 0 is the master unit MU, and receives the control parameter Pr from the control terminal 20 via a terminal communication line TCL. However, the other power supply units 11 to 13 are the slave unit SU, and receive the control parameter Pr from the master unit MU via the inter-unit communication line UCL. Note that the master unit MU and the slave units SU indicate the functions of the power supply units 10 to 13 in data communication before the start of outputting, and the power supply units 10 to 13 after the start of the output operate without distinction between the master unit MU and the slave units SU.

The control terminal 20 is a device that controls the power supply system 100, generates a control parameter Pr of the power supply units 10 to 13, and transmits the control parameter Pr to the master unit MU. The control parameter Pr is generated and outputted based on, for example, a user operation. For example, a PC on which a dedicated program is installed can be used as the control terminal 20.

The terminal communication line TCL is a wired or wireless communication path that is used for data communication between the control terminal 20 and the master unit MU. For communication with the control terminal 20, for example, a packet communication system for transmitting and receiving TCP/IP (Transmission Control Protocol/Internet Protocol) packets can be adopted, and a connection can also be made via a Local Area Network (LAN) or the Internet.

The inter-unit communication line UCL is a wired communication path that is used for data communication between the power supply units 10 to 13. For the inter-unit communication, for example, a multi-master bus communication system as per the controller area network (CAN) standard is adopted, and data can be transmitted from any of the power supply units 10 to 13 to any of the power supply units 10 to 13.

The isolated communication lines ZCL are wired communication paths for transmitting a trigger signal indicating the start of outputting, and each include a pair of signal lines isolated from the power supply units 10 to 13 and having a photocoupler interposed therebetween. The pair of isolated communication lines ZCL are capable of transitioning between a conductive state and a non-conductive state, and the trigger signal is a pulse signal that brings the pair of isolated communication lines ZCL into conduction with a fixed time width, and is transmitted from the master unit MU (power supply unit 10) to all the slave units SU (power supply units 11 to 13).

(2) Power Supply Units 10 to 13

Figure 2:
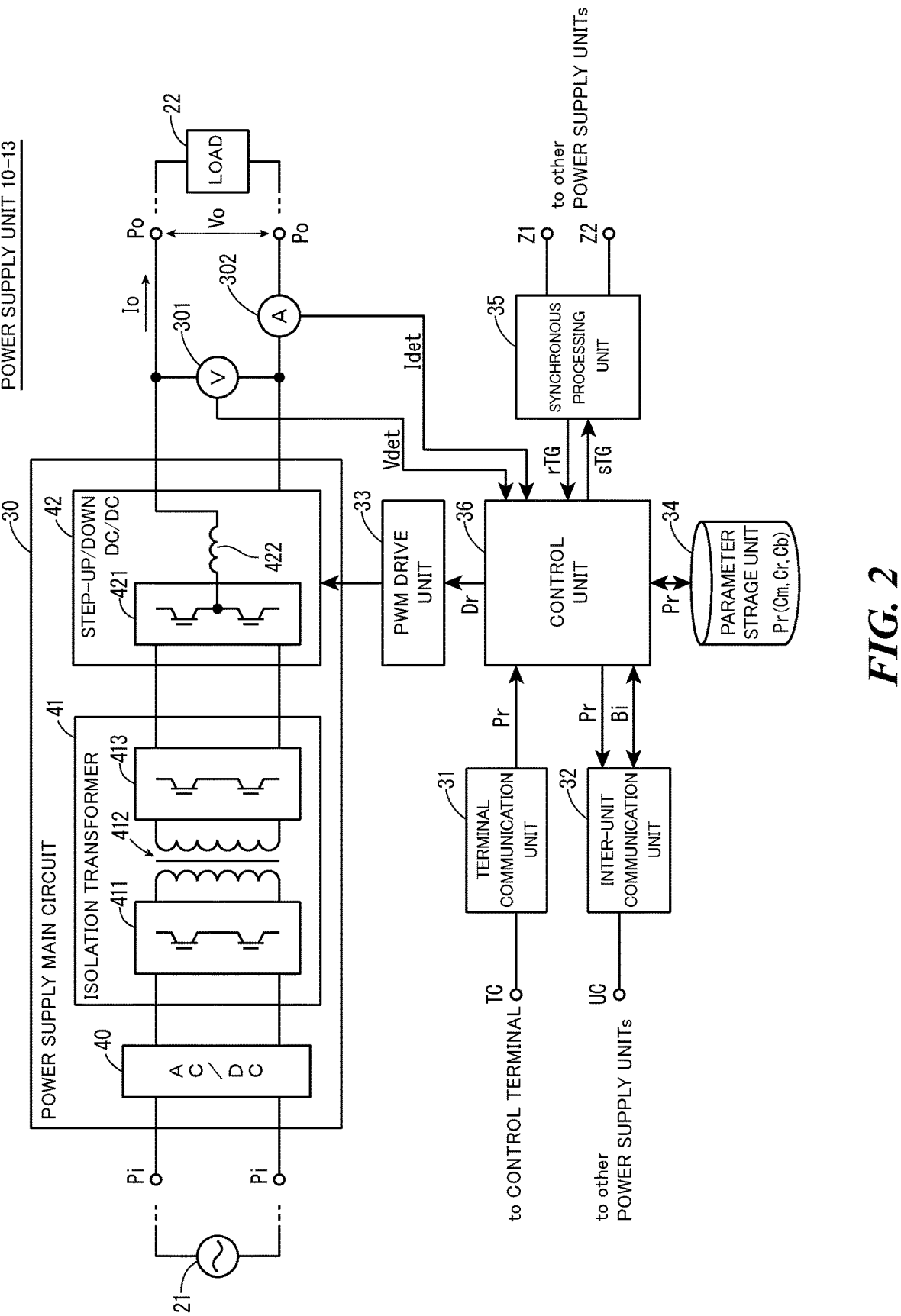
FIG. 2 is a diagram showing an example of a detailed configuration of the power supply units 10 to 13.

FIG. 2 is a diagram showing an example of a detailed configuration of the power supply units 10 to 13. The power supply units 10 to 13 include a power supply main circuit a voltage detection unit 301, a current detection unit 302, a terminal communication unit 31, an inter-unit communication unit 32, a PWM drive unit 33, a parameter storage unit 34, a synchronous processing unit 35, and a control unit 36.

A) Power Supply Main Circuit 30

The power supply main circuit 30 is a circuit that converts AC power inputted from the power grid via an input terminal Pi into DC power and outputs the DC power to the load 22 via an output terminal Po. The operation of the power supply main circuit 30 is controlled based on the control parameter Pr. Specifically, when the operation mode is constant current operation (CC), the output current operates to match the target value Cr, and when the operation mode is constant voltage operation (CV), an output voltage Vo is controlled to match the target value Cr. The target value Cr is a target current Iref in constant current operation or a target voltage Vref in constant voltage operation.

The power supply main circuit 30 is a bidirectional power supply (regenerative power supply) capable of bidirectionally converting AC power and DC power, and capable not only of performing a power operation to convert an AC voltage into a DC voltage and supply energy to the load 22, but also of performing a regenerative operation to convert a DC voltage into an AC voltage and absorb energy from the load 22, according to the status of the load 22.

The power supply main circuit 30 includes an AC/DC converter 40 that converts an AC voltage into a DC voltage, an isolation transformer 41 for isolating the input from the output, and a step-up/down DC/DC converter 42 that controls the output voltage Vo.

The AC/DC converter 40 is a bidirectional converter capable of bidirectionally converting AC power and DC power, and can be configured using, for example, a three-state switching element.

The isolation transformer 41 is a bidirectional DC/DC converter capable of bidirectionally transmitting DC power while ensuring isolation between the primary side and the secondary side, and includes a transformer 412, a DC/AC converter 411 connected to the primary side of the transformer 412, and an AC/DC converter 413 connected to the secondary side of the transformer 412. The direct current inputted from the AC/DC converter 40 is converted into an alternating current by the DC/AC converter 411, and, after passing through the transformer 412, is converted into a direct current again by the AC/DC converter 413. When the alternating current passing through the transformer 412 has a high frequency, isolation can be performed using a small transformer, and the entire device can be downsized.

The step-up/down DC/DC converter 42 is a bidirectional DC/DC converter that controls the output voltage Vo based on the control parameter Pr, and a chopper circuit including a switching circuit 421 and an inductance 422, for example, can be used. The switching circuit 421 includes two switching elements connected in series, and one end of the inductance 422 is connected to a connection point between the two switching elements. The two switching elements operate so as to alternately repeat a state in which one element is turned on while the other element is turned off, and a state in which one element is turned off while the other element is turned on, based on a PWM signal from the PWM drive unit 33, and generate the output voltage Vo according to the corresponding duty ratio.

B) Voltage Detection Unit 301 and Current Detection Unit 302

The voltage detection unit 301 is means for detecting the output voltage Vo of the power supply main circuit 30. The detection value of the voltage detection unit 301 is inputted to the control unit 36 as a detected voltage Vdet. The current detection unit 302 is means for detecting an output current Io of the power supply main circuit 30. The detection value of the current detection unit 302 is inputted to the control unit 36 as a detected current Idet.

C) Terminal Communication Unit 31

The terminal communication unit 31 is a packet communication means that communicates with the control terminal 20 via the terminal communication line TCL. The terminal communication unit 31 of the master unit MU receives the control parameter Pr from the control terminal 20 and outputs the control parameter Pr to the control unit 36. The terminal communication unit 31 of the slave unit SU is not used, and the terminal communication unit 31 of the master unit MU acquires not only the control parameter Pr of the master unit MU but also the control parameter Pr of the slave unit SU.

D) Inter-Unit Communication Unit 32

The inter-unit communication unit 32 is means for performing data communication between the power supply units 10 to 13 via the inter-unit communication line UCL. In inter-unit communication, any of the power supply units 10 to 13 is capable of outputting transmission data onto the inter-unit communication line UCL. The transmission data includes the unit identification information UID of the transmission source or the transmission target, and each power supply unit 10 to 13 monitors the transmission data on the inter-unit communication line UCL and selectively receives data necessary for that power supply unit based on the unit identification information UID of the transmission source or the transmission target.

The control parameter Pr for the slave units SU is transmitted from the master unit MU to the slave units SU by inter-unit communication. The detected current Idet and the detected voltage Vdet detected by each power supply unit 10 to 13 are transmitted as balance information Bi to the other power supply units 10 to 13 by inter-unit communication.

E) PWM Drive Unit 33

The PWM drive unit 33 generates a PWM (Pulse Wide Modulation) signal based on a drive signal Dr generated by the control unit 36, and outputs the PWM signal to the switching circuit 421. Therefore, the power supply main circuit 30 outputs a voltage corresponding to the drive signal Dr.

F) Parameter Storage Unit 34

The parameter storage unit 34 is storage means for storing various parameters referred to by the control unit 36, and holds the control parameter Pr received from the control terminal 20. The control parameter Pr includes operation mode information Cm, the target value Cr, and balance adjustment target information Cb.

The operation mode information Cm is a parameter indicating constant current operation (CC) or constant voltage operation (CV) as the control method of the power supply system 100, and is a parameter common to each power supply unit 10 to 13. The target value Cr is a target current Iref during constant current operation (CC) and a target voltage Vref during constant voltage operation (CV). The balance adjustment target information Cb is an identification number of one or more other power supply units 10 to 13 to be referred to when balance adjustment is performed. The balance adjustment target information Cb is automatically generated by the user designating the unit configuration and the operation mode on the control terminal 20. Therefore, the user is able to construct the power supply system 100 without being conscious of balance adjustment.

G) Synchronous Processing Unit 35

The synchronous processing unit 35 is means for synchronizing the operation timing of the power supply units 10 to 13, and transmits and receives a trigger signal TG for matching the timing for starting to output power via the isolated communication terminals Z1 and Z2.

The synchronous processing unit 35 is capable of outputting the trigger signal TG to the isolated communication lined ZCL, and of detecting the trigger signal on the isolated communication lined ZCL. The trigger signal TG is outputted as a pulse signal corresponding to a conductive state of the pair of isolated communication lines ZCL. Therefore, the trigger signal TG can be quickly detected in all the power supply units 10 to 13, thereby yielding a high noise resistance and making it possible to suppress malfunction.

When the trigger transmission signal sTG is inputted from the control unit 36, the synchronous processing unit 35 of the master unit MU outputs the trigger signal TG to the pair of isolated communication lines ZCL. However, the synchronous processing units 35 of the master unit MU and the slave units SU monitor the isolated communication lines ZCL, and upon detecting the trigger signal TG, output the trigger detection signal rTG to the control unit 36.

H) Control Unit 36

The control unit 36 generates the drive signal Dr based on the detected voltage Vdet or the detected current Idet, and controls the power supply main circuit 30 via the PWM drive unit 33. In addition, the terminal communication unit 31 and the inter-unit communication unit 32 are controlled to perform data communication with the control terminal 20 and other power supply units 10 to 13. Furthermore, the synchronous processing unit 35 is controlled to perform synchronized control of the output start timing between the power supply units 10 to 13.

(3) Balance Adjustment

FIG. 3 is a table indicating whether or not balance adjustment is necessary. In the power supply system 100, which includes two or more power supply units 10 to 13, it is determined, through a combination of the unit configuration and the operation mode, whether or not balance adjustment between the power supply units 10 to 13 is necessary. The unit configuration signifies the way in which the power supply units 10 to 13 are connected in the power supply system 100.

In a case where the operation mode is constant current operation (CC), the control target of each of the power supply units 10 to 13 is the respective output current Io, and in a case where the operation mode is constant voltage operation (CV), the control target of each of the power supply units 10 to 13 is the respective output voltage Vo. In a case where two or more power supply units 10 to 13 are connected in series, the output currents Io of each of the power supply units 10 to 13 have the same value, and in a case where two or more power supply units 10 to 13 are connected in parallel, the output voltages Vo of each of the power supply units 10 to 13 have the same value. Therefore, in a case where a combination of the unit configuration and the operation mode is adopted such that the output current Io or the output voltage Vo is to be controlled by each power supply unit 10 to 13 and has the same value among the power supply units 10 to 13, balance adjustment is necessary.

In the case of a power supply system 100 in which two or more power supply units 10 to 13 are connected in parallel and perform constant current operation (CC) (parallel CC setup), the control target in each power supply unit 10 to 13 is the output current Io, but a control error of the output current Io in any of the power supply units 10 to 13 does not affect control of the output current Io in the other power supply units 10 to 13. Therefore, balance adjustment between the power supply units 10 to 13 is unnecessary.

In the case of a power supply system 100 in which two or more power supply units 10 to 13 are connected in series and perform constant current operation (CC) (series CC setup), the control target in each power supply unit 10 to 13 is the output current Io, and an error of the output current Io in any power supply unit 10 to 13 affects the output current Io in the other power supply units 10 to 13. Therefore, balance adjustment between the power supply units 10 to 13 is necessary.

In the case of a power supply system 100 in which two or more power supply units 10 to 13 are connected in parallel and perform constant voltage operation (CV) (parallel CV setup), the control target of each power supply unit 10 to 13 is the output voltage Vo, and an error of the output voltage Vo in any power supply unit 10 to 13 affects the output voltage Vo of the other power supply units 10 to 13. Therefore, balance adjustment between the power supply units 10 to 13 is necessary.

In the case of a power supply system 100 in which two or more power supply units 10 to 13 are connected in series and perform constant voltage operation (CV) (series CV setup), the control target of each power supply unit 10 to 13 is the output voltage Vo, and an error of the output voltage Vo in any power supply unit 10 to 13 does not affect the output voltage Vo of the other power supply units 10 to 13. Therefore, balance adjustment between the power supply units 10 to 13 is unnecessary.

(4) Description of Operation of Basic Unit Configuration

FIGS. 4 to 7 are diagrams showing a basic unit configuration of the power supply system 100 and an example of a method of controlling the basic unit configuration. A specific control method including balance adjustment will be described below with reference to these drawings.

A) Parallel CC Setup

Figure 4:
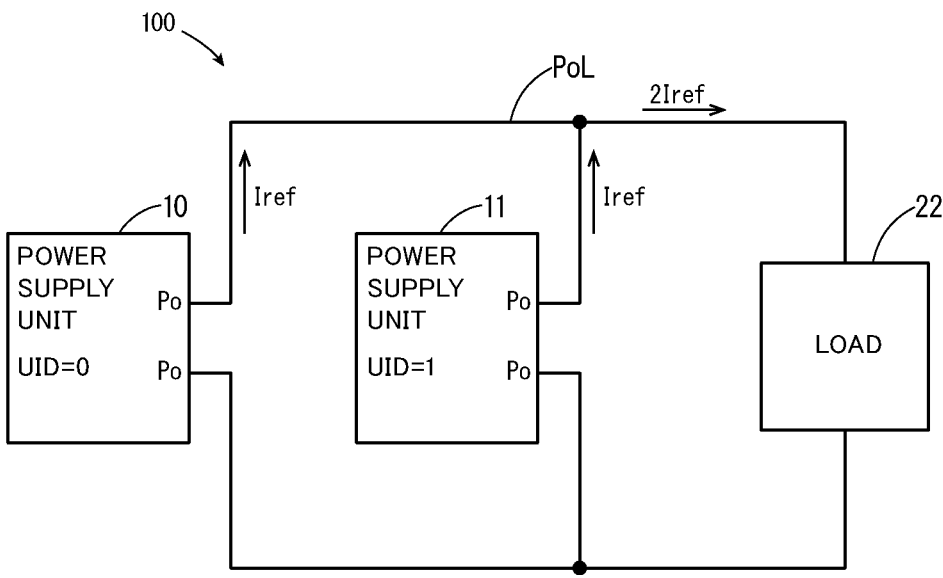
FIG. 4 is an explanatory diagram of parallel CC setup.
Figure 4:
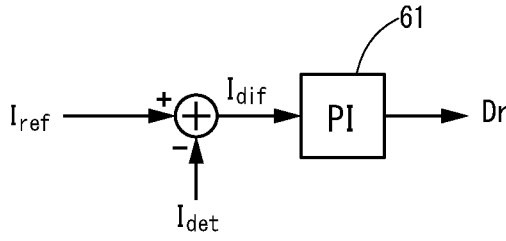

FIG. 4 is an explanatory diagram of parallel CC setup in which two or more power supply units 10 and 11 are connected in parallel and used as a constant current source. FIG. 4(*a*) shows a unit configuration of the power supply system 100, and FIG. 4(*b*) shows control processing of the power supply main circuit 30 in each of the power supply units 10 and 11.

As shown in FIG. 4(*a*), the power supply units 10 and 11 are connected in parallel and connected to a common load 22. In both the power supply units 10 and 11, the constant current operation (CC) is designated in advance as the operation mode information Cm, and the target current Iref is provided beforehand as the target value Cr. Because the power supply units 10 and 11 connected in parallel each output the current Iref, the current Iref×2 can be supplied to the load 22. Note that, because balance adjustment is unnecessary, the balance adjustment target information Cb is not designated. Note that a different value can be designated for the target current Iref of each of the power supply units 10 and 11.

As shown in FIG. 4(*b*), the control unit 36 performs PI control based on the detected current Idet and generates a drive signal Dr that matches the output current Io to the target current Iref. Specifically, the difference Idif between the target current Iref and the detected current Idet is obtained, PI processing 61 is performed to generate the drive signal Dr, and the drive signal Dr is outputted to the PWM drive unit 33. The PI processing 61 is an arithmetic operation to obtain a sum of a proportional term obtained by multiplying the difference Idif by a predetermined coefficient and an integral term obtained by multiplying an integral value of the difference Idif by a predetermined coefficient. By selecting these coefficients, feedback control with the desired responsiveness and stability can be performed.

In a case where the power supply units 10 and 11 are connected in parallel and each perform constant current operation (CC), a control error in one power supply unit 10(11) does not affect the operation of the other power supply unit 11(10). Therefore, balance adjustment between the power supply units 10 and 11 is unnecessary. For example, in a case where the current detection unit 302 generates a detected current Idet including a slight error in the power supply unit 10, a slight error also occurs in the output current Io of the power supply unit 10. However, this error does not affect the operation of the power supply unit 11, and the balance between the power supply units 10, 11 is not greatly lost. Therefore, in the case of this kind of power supply system 100, it is not necessary to perform balance adjustment.

B) Series CC Setup

Figure 5:
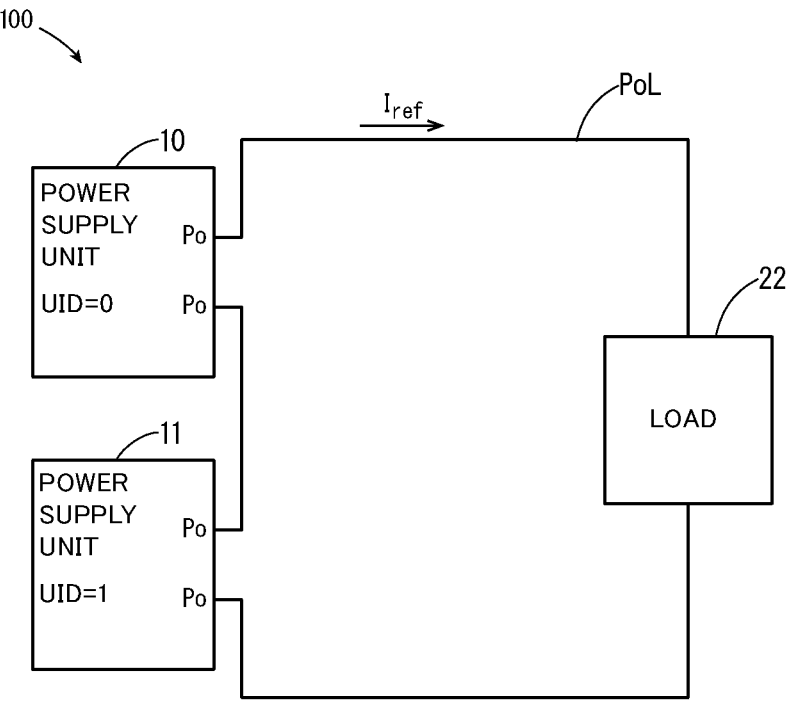
FIG. 5 is an explanatory diagram of a series CC setup.
Figure 5:
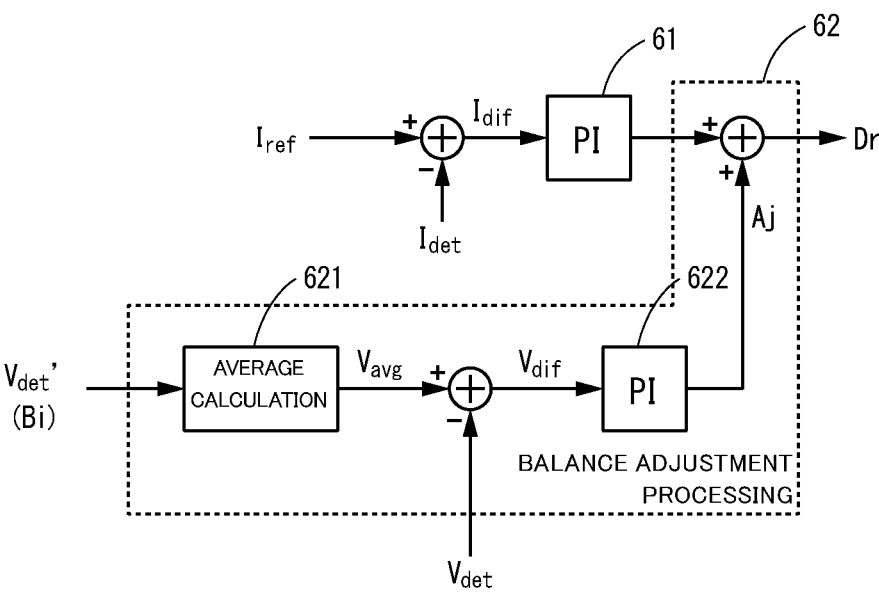

FIG. 5 is an explanatory diagram of a series CC setup in which two or more power supply units 10 and 11 are connected in series and used as a constant current source. FIG. 5(*a*) shows a unit configuration of the power supply system 100, and FIG. 5(*b*) shows control processing of the power supply main circuit 30 in each of the power supply units 10 and 11.

As shown in FIG. 5(*a*), the power supply units 10 and 11 are connected in series and connected to a common load 22. In each of the power supply units 10 and 11, constant current operation (CC) is designated in advance as the operation mode information Cm, and the same target current Iref is provided beforehand as the target value Cr. Because the power supply units 10 and 11 connected in series each output the current Iref, the current Iref can be supplied to the load 22. In the power supply system 100, because it is necessary to adjust the balance between the power supply units 10 and 11, another power supply unit is designated as the balance adjustment target information Cb.

The output currents Io of the power supply units 10 and 11 connected in series always match each other. Therefore, in a case where each of the power supply units 10 and 11 independently performs constant current operation (CC) without performing balance adjustment, a slight control error in one of the power supply units 10(11) affects the operation of the other power supply unit 11(10), which causes a significant imbalance between the power supply units 10 and 11.

For example, in a case where the current detection unit 302 of the power supply unit 10 generates, as the detected current Idet, a value slightly smaller than the actual output current Io, the power supply unit 10 performs control to set the output current Io to a value slightly larger than the target current Iref. At this time, because the output current Io of the power supply unit 11 also has the same value, the power supply unit 11 performs control to decrease the output current Io. By repeating such control, the output voltage Vo of the power supply unit 10 becomes excessively large, the output voltage Vo of the power supply unit 11 becomes excessively small, and the balance between the power supply units 10 and 11 is greatly lost. In addition, even if the calibration of the current detection unit 302 is carefully performed, it is not possible to completely eliminate variation between power supply units 10, and hence balance adjustment between the power supply units 10 and 11 is necessary.

As shown in FIG. 5(*b*), the control unit 36 generates the drive signal Dr by performing PI control based on the detected current Idet and balance adjustment based on the detected voltage Vdet. The control processing is different from the control processing of FIG. 4(*b*) in that balance adjustment processing 62 is included. The balance adjustment processing 62 is processing to obtain an adjustment amount Aj based on the difference between the detected voltage Vdet' of the balance adjustment target and the detected voltage Vdet of the own unit, and to correct the drive signal Dr based on the adjustment amount Aj.

In a case where other power supply units 10 and 11 connected in series are used as balance adjustment targets and there are two or more balance adjustment targets, an average calculation 621 for finding the average of the detected voltages Vdet' is performed, the difference Vdif between the average value and the detected voltage Vdet of the own unit is obtained, and PI processing 622 is performed to determine the adjustment amount Aj. By adding the adjustment amount Aj to the drive signal Dr in FIG. 4(b), the drive signal Dr after balance adjustment is generated. That is, the drive signal Dr is corrected so that the difference Vdif of the detected voltage between the balance adjustment target and the own unit decreases, thereby preventing the balance from being greatly lost.

The inter-unit communication unit 32 receives the detected voltage Vdet' of the balance adjustment target as balance information Bi. In a case where three or more power supply units are connected in series, two or more power supply units except the own unit are designated in advance as the balance adjustment target information Cb, the two or more detected voltages Vdet' are received, and the average calculation 621 is performed. However, because the power supply system 100 in FIG. 5 includes only the two power supply units 10 and 11, the average calculation 621 is omitted. Note that the detected voltage Vdet of the own unit can also be included in the target of the average calculation 621. In this case, the average calculation 621 is performed even in a case where only the two power supply units 10 and 11 are included.

C) Series CV Setup

Figure 6:
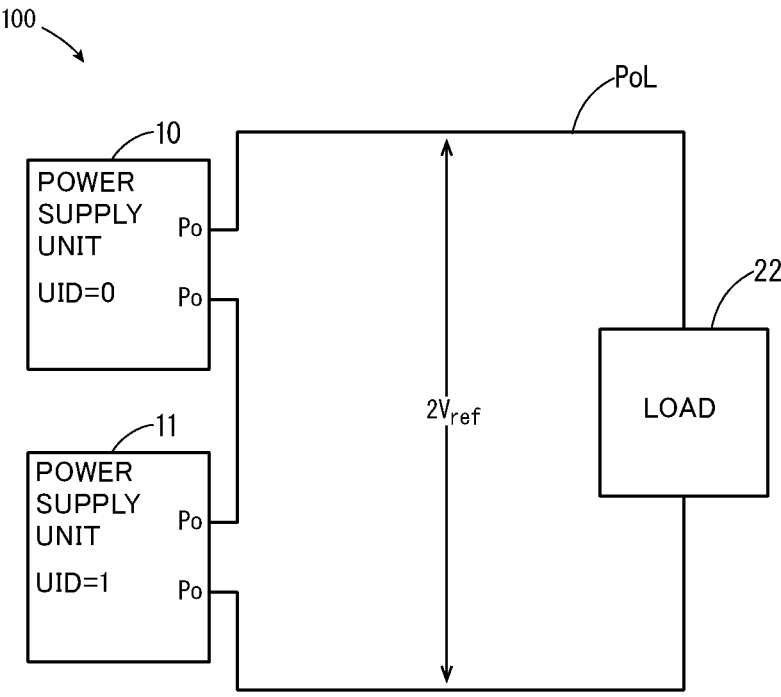
FIG. 6 is an explanatory diagram of a series CV setup.
Figure 6:
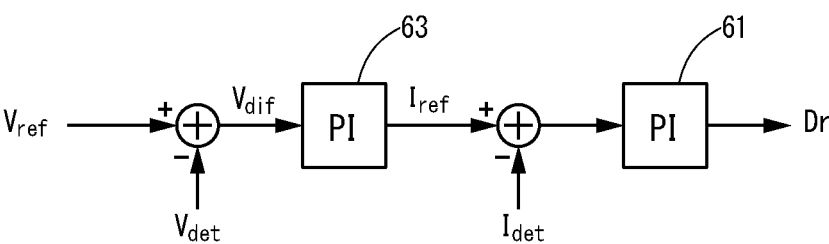

FIG. 6 is an explanatory diagram of a series CV setup in which two or more power supply units 10 and 11 are connected in series and used as a constant voltage source. FIG. 6(a) shows a unit configuration of the power supply system 100, and FIG. 6(b) shows control processing of the power supply main circuit 30 in each of the power supply units 10 and 11.

As shown in FIG. 6(a), the power supply units 10 and 11 are connected in series and connected to a common load 22. In both the power supply units 10 and 11, constant voltage operation (CV) is designated in advance as the operation mode information Cm, and a target voltage Vref is provided beforehand as the target value Cr. Because the power supply units 10 and 11 connected in series each output the voltage Vref, the voltage Vref×2 can be supplied to the load 22. Note that, because balance adjustment is unnecessary, the balance adjustment target information Cb is not designated. Note that a different value can be designated for the target voltage Vref of each of the power supply units 10 and 11.

As shown in FIG. 6(b), the control unit 36 generates a drive signal Dr that matches the output voltage Vo to the target voltage Vref by determining the target current Iref by PI control based on the detected voltage Vdet and performing PI control based on the detected current Idet. Specifically, the difference Vdif between the target voltage Vref and the detected voltage Vdet is obtained, and the target current Iref is determined by performing the PI processing 63. Next, the difference Idif between the target current Iref and the detected current Idet is obtained, and, by performing PI processing 61, the drive signal Dr is generated and outputted to the PWM drive unit 33.

In a case where the power supply units 10 and 11 are connected in series and each perform constant voltage operation (CV), a control error in one power supply unit 10(11) does not affect the operation of the other power supply unit 11(10). Therefore, balance adjustment between the power supply units 10 and 11 is unnecessary. For example, in a case where the voltage detection unit 301 generates a detected voltage Vdet that includes a slight error in the power supply unit 10, a slight error also occurs in the output voltage Vo of the power supply unit 10. However, this error does not affect the operation of the power supply unit 11, and the balance between the power supply units 10, 11 is not greatly lost. Therefore, in the case of this kind of power supply system 100, it is not necessary to perform balance adjustment.

D) Parallel CV Setup

Figure 7:
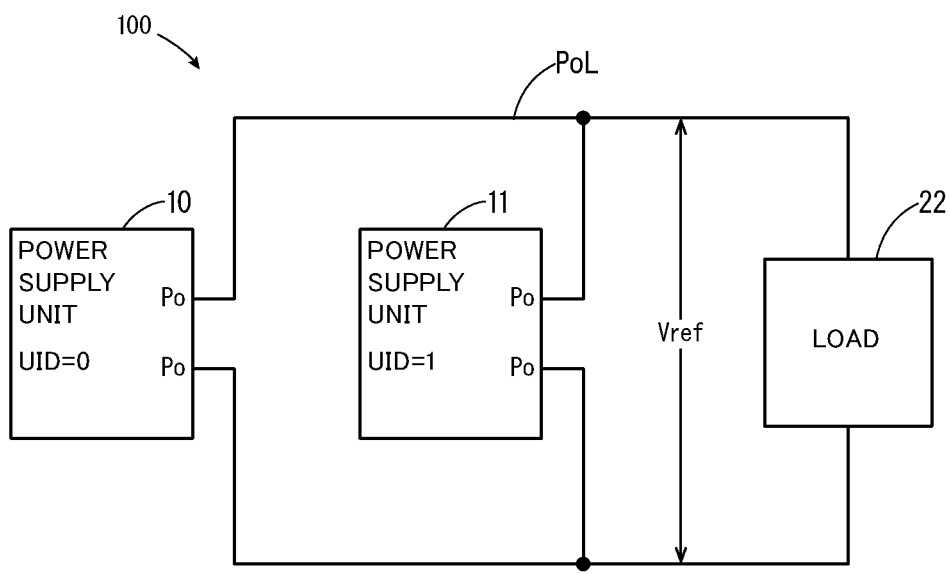
FIG. 7 is an explanatory diagram of a parallel CV setup.
Figure 7:
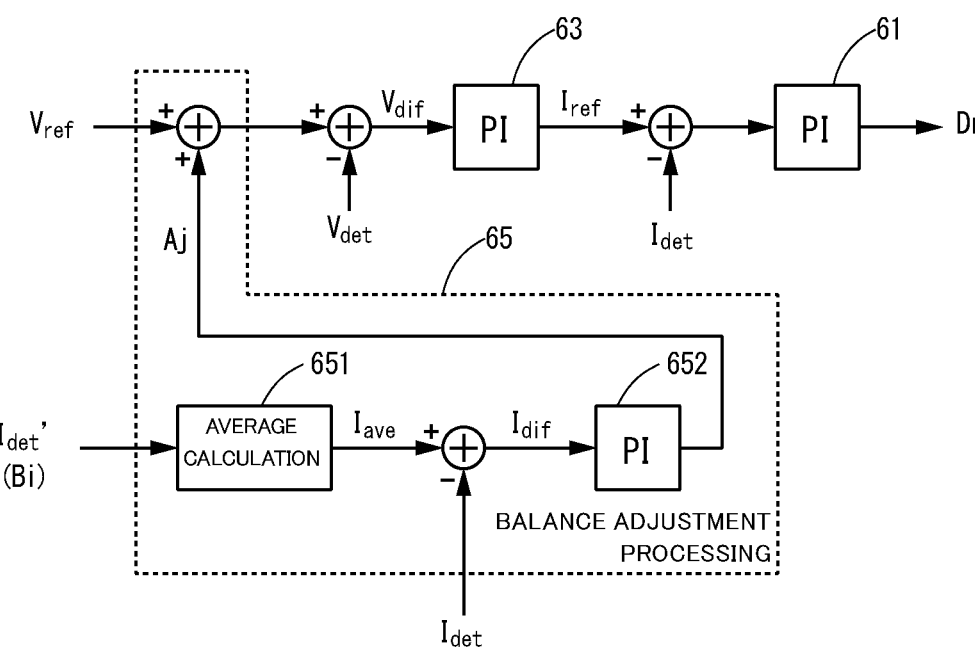

FIG. 7 is an explanatory diagram of a parallel CV setup in which two or more power supply units 10 and 11 are connected in parallel and used as a constant voltage source. FIG. 7(a) shows a unit configuration of the power supply system 100, and FIG. 7(b) shows control processing of the power supply main circuit 30 in each of the power supply units 10 and 11.

As shown in FIG. 7(a), the power supply units 10 and 11 are connected in parallel and connected to a common load 22. In each of the power supply units 10 and 11, constant voltage operation (CV) is designated in advance as the operation mode information Cm, and the same target voltage Vref is provided beforehand as the target value Cr. Because the power supply units 10 and 11 connected in parallel each output the voltage Vref, the voltage Vref can be supplied to the load 22. In the power supply system 100, because it is necessary to adjust the balance between the power supply units 10 and 11, another power supply unit is designated as the balance adjustment target information Cb.

The output voltages Vo of the power supply units 10 and 11 connected in parallel always match each other. Therefore, in a case where each of the power supply units 10 and 11 independently performs constant voltage operation (CV) without performing balance adjustment, a slight control error in one of the power supply units 10(11) affects the operation of the other power supply unit 11(10), which causes a significant imbalance between the power supply units 10 and 11.

For example, in a case where the voltage detection unit 301 of the power supply unit 10 generates a value slightly smaller than the actual output voltage Vo as the detected voltage Vdet, the power supply unit 10 performs control to set the output voltage Vo to a value slightly larger than the target voltage Vref. At this time, because the output voltage Vo of the power supply unit 11 also has the same value, the power supply unit 11 performs control to decrease the output voltage Vo. By repeating such control, the power supply unit 10 supplies the maximum current, the power supply unit 11 absorbs the maximum current, and the balance between the power supply units 10 and 11 is greatly lost. Therefore, balance adjustment between the power supply units 10 and 11 is necessary.

As shown in FIG. 7(b), the control unit 36 generates the drive signal Dr by performing PI control based on the detected voltage Vdet and the detected current Idet and balance adjustment based on the detected current Idet. The control processing is different from the control processing of FIG. 6(b) in that balance adjustment processing 65 is included. The balance adjustment processing 65 is processing to obtain the adjustment amount Aj based on the difference between the detected current Idet' of the balance adjustment target and the detected current Idet of the own unit and to correct the drive signal Dr based on the adjustment amount Aj.

In a case where the other power supply units 10 and 11 connected in parallel are set as the balance adjustment targets and there are two or more balance adjustment targets, an average calculation 651 for finding the average of the detected currents Idet' is performed, the difference Idif between the average value and the detected current Idet of the own unit is obtained, and PI processing 652 is performed to determine the adjustment amount Aj. By adding the adjustment amount Aj to the target voltage Vref, balance adjustment between the power supply units is performed. That is, the drive signal Dr is corrected so that the difference Idif of the detected current between the balance adjustment target and the own unit decreases, thereby preventing the balance from being greatly lost.

The detected current Idet' of the balance adjustment target is received as balance information Bi by the inter-unit communication unit 32. In a case where three or more power supply units are connected in parallel, two or more power supply units except the own unit are designated in advance as the balance adjustment target information Cb, two or more detected currents Idet' are received, and the average calculation 651 is performed. However, because the power supply system 100 in FIG. 7 includes only the two power supply units 10 and 11, the average calculation 651 is omitted. Note that the detected current Idet of the own unit can also be included in the target of the average calculation 651. In this case, the average calculation 651 is performed even in a case where only the two power supply units 10 and 11 are included.

(5) Description of Operation for More Complex Unit Configuration

Figure 8:
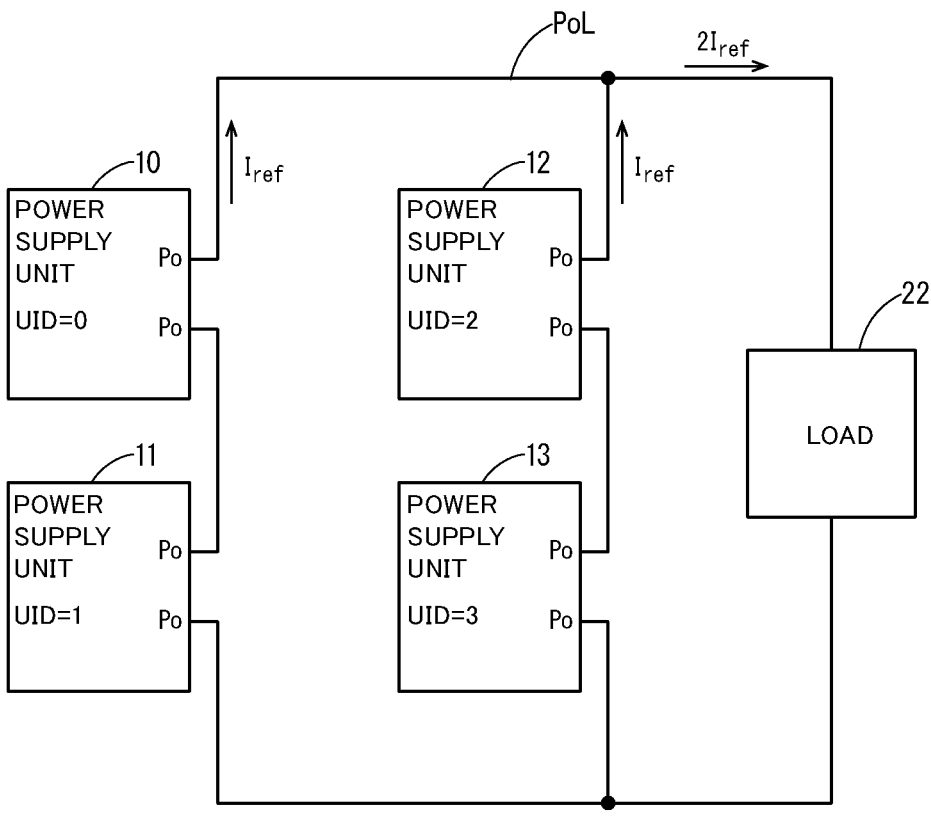
FIG. 8 is an explanatory diagram of a series-parallel CC setup.
Figure 9:
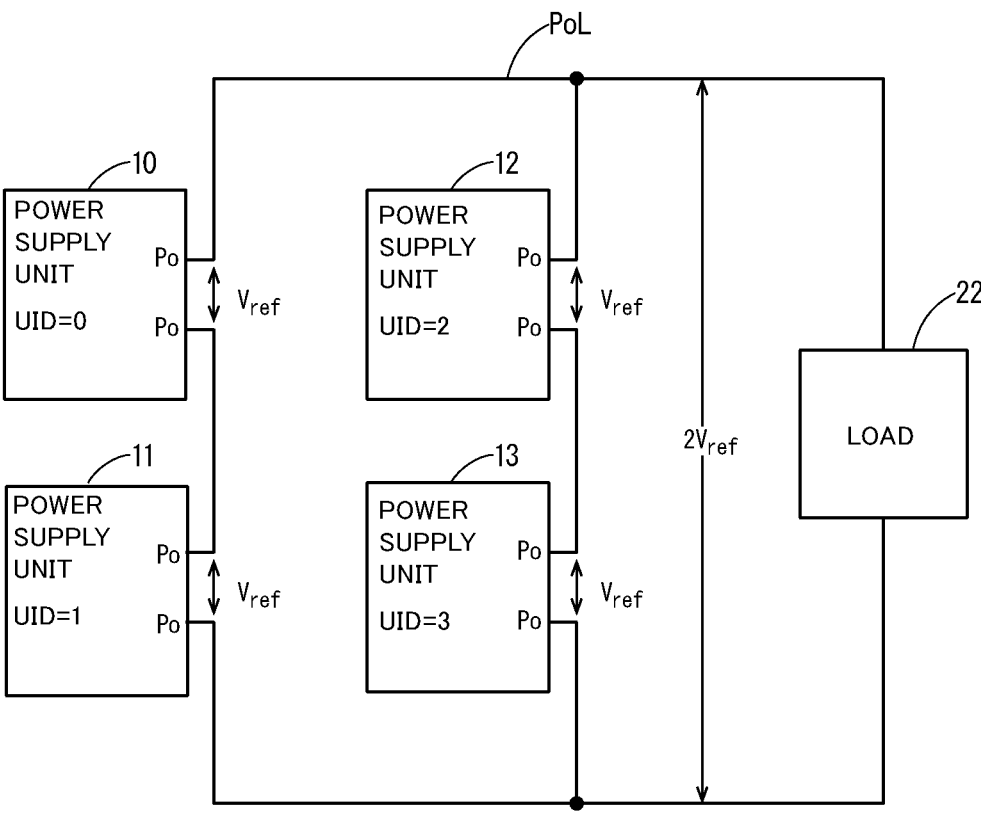
FIG. 9 is an explanatory diagram of a series-parallel CV setup.

FIGS. 8 and 9 are diagrams showing a more complicated unit configuration of the power supply system 100 and an example of a method for controlling the unit configuration. In (3) and (4) above, a power supply system 100 having a basic unit configuration involving only a series connection or a parallel connection has been described, but the present invention can be applied to a power supply system having an arbitrary unit configuration. Hereinafter, a specific control method including balance adjustment will be described for an example of a power supply system 100 having a more complicated unit configuration.

A) Series-Parallel CC Setup

FIG. 8 is an explanatory diagram of a series-parallel CC setup in which four power supply units 10 to 13 are connected in series and parallel and used as a constant current source. Note that the term "series-parallel" as used herein refers to a connection form of three or more power supply units in which series connections and parallel connections are mixed.

In the unit configuration shown in FIG. 8, a series circuit of the power supply units 10 and 11 and a series circuit of the power supply units 12 and 13 are connected in parallel and connected to a common load 22. In all the power supply units 10 to 13, constant current operation (CC) is designated in advance as the operation mode information Cm, and a target current Iref is provided beforehand as the target value Cr.

Two power supply units belonging to the same series circuit correspond to series CC setup, and it is necessary to perform balance adjustment. However, the connection between the series circuits corresponds to a parallel CC setup, and thus there is no need to perform balance adjustment. Therefore, one of the power supply units 10 and 11 is designated with the other of the power supply units 10 and 11 as the balance adjustment target information Cb. Similarly, one of the power supply units 12 and 13 is designated with the other of the power supply units 12 and 13 as the balance adjustment target information Cb. The control unit 36 of each of the power supply units 10 to 13 performs the control processing shown in FIG. 5(b).

B) Series-Parallel CV Setup

FIG. 9 is an explanatory diagram of a series-parallel CV setup in which four power supply units 10 to 13 are connected in series and parallel and used as a constant voltage source.

The unit configuration shown in FIG. 9 is the same as the unit configuration in FIG. 8. In all the power supply units 10 to 13, constant voltage operation (CV) is designated in advance as the operation mode information Cm, and the same target voltage Vref is provided beforehand as the target value Cr.

Two power supply units belonging to the same series circuit correspond to a series CV setup, and it is not necessary to perform balance adjustment. However, the connection between the series circuits corresponds to a parallel CV setup, and it is necessary to perform balance adjustment. Therefore, in each power supply unit 10 to 13, a power supply unit belonging to a series circuit different from its own unit is designated as the balance adjustment target information Cb. That is, both the power supply units 12 and 13 are designated as the balance adjustment target information Cb for each of the power supply units 10 and 11, and both the power supply units 10 and 11 are designated as the balance adjustment target information Cb for each of the power supply units 12 and 13. The control unit 36 of each of the power supply units 10 to 13 performs the control processing shown in FIG. 7(b).

(6) Detailed Configuration of Synchronous Processing Unit 35

Figure 10:
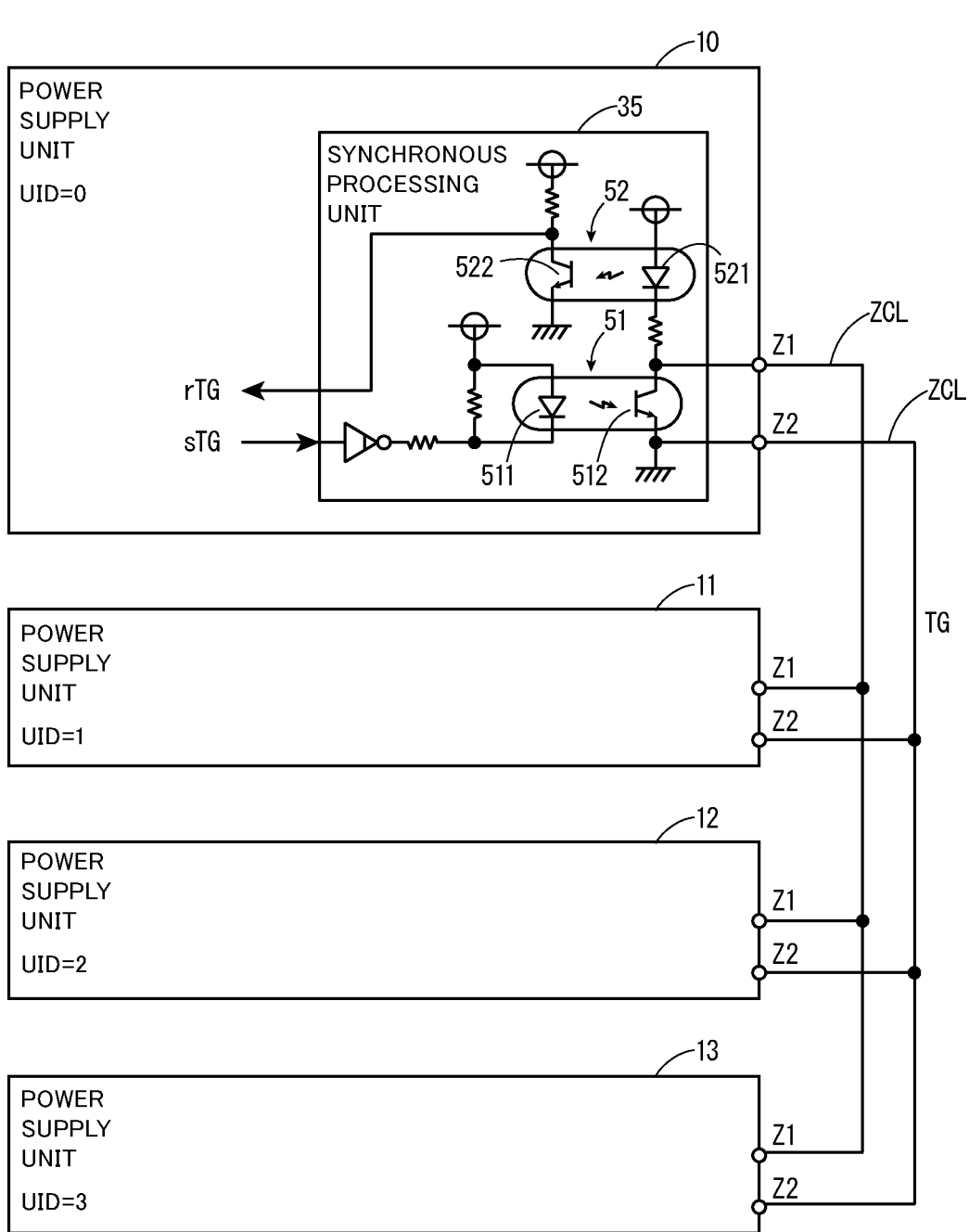
FIG. 10 is a diagram showing an example of a detailed configuration of the synchronous processing unit 35.

FIG. 10 is a diagram showing an example of a detailed configuration of the synchronous processing unit 35. The synchronous processing unit 35 has two isolated communication terminals Z1 and Z2, and the two or more power supply units 10 to 13 have the terminals Z1 and Z2 connected to each other using a pair of isolated communication lines ZCL. The synchronous processing unit 35 transmits a trigger signal by establishing conduction between the pair of isolated communication lines ZCL, and receives the trigger signal by detecting a conductive state between the isolated communication lines ZCL.

The synchronous processing unit 35 includes two photo-couplers 51 and 52. The photocoupler 51 is a transmission photocoupler for transmitting the trigger signal, and the photocoupler 52 is a reception photocoupler for receiving the trigger signal.

The transmission photocoupler 51 includes a light-emitting element 511 driven by a trigger transmission signal sTG from the control unit 36 and a light-receiving element 512 that establishes conduction between the terminals Z1 and Z2 when the light-emitting element 511 emits light. When the trigger transmission signal sTG is not inputted, there is no conduction between the terminals Z1 and Z2, and when the trigger transmission signal sTG is inputted from the control unit 36, conduction is established between the terminals Z1 and Z2.

The reception photocoupler 52 includes a light-emitting element 521 driven by conduction between the pair of isolated communication lines ZCL, and a light-receiving element 522 that outputs a trigger reception signal rTG when the light-emitting element 521 emits light. For this reason, the trigger reception signal rTG is not outputted when there is no conduction between the pair of isolated communication lines ZCL, whereas the trigger reception signal rTG is outputted to the control unit 36 when there is conduction between the pair of isolated communication lines ZCL.

The terminals Z1 and Z2 of all the power supply units 10 to 13 are respectively connected via a pair of isolated communication lines ZCL, and the light-receiving elements 512 of the transmission photocouplers 51 are connected in parallel. Therefore, when the trigger signal is transmitted from any one of the power supply units 10 to 13, the pair of isolated communication lines ZCL conducts. The light-emitting element 521 of the reception photocoupler 52 is connected in series with the light-receiving element 512 of the transmission photocoupler 51, detects a conductive state or a non-conductive state between the pair of isolated communication lines ZCL, and generates a trigger reception signal rTG.

Figure 11:
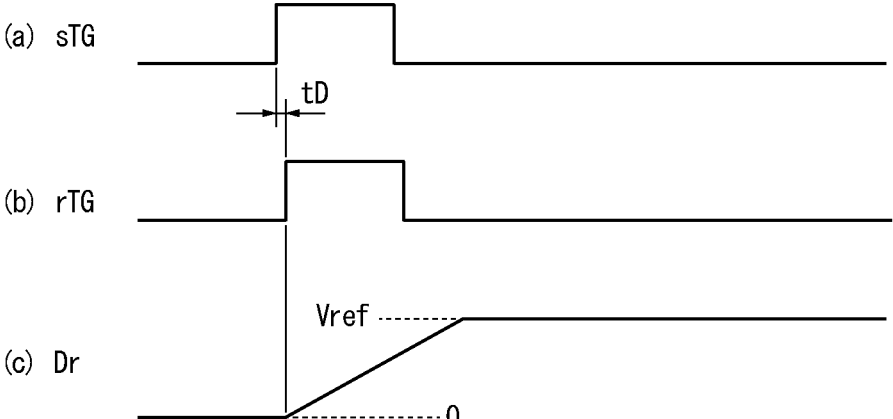
FIG. 11 is a timing chart showing an example of an output start operation of the power supply system 100.

FIG. 11 is a timing chart showing an example of an output start operation of the power supply system 100. (a) in FIG. 11 represents the trigger transmission signal sTG in the master unit MU, and (b) and (c) are the trigger reception signal rTG and the drive signal Dr of each of the power supply units 10 to 13. Here, the operation mode is constant voltage (CV) operation, and output control is performed so that the output voltage Vo matches the target voltage Vref. In addition, at the start of the output, soft start control is performed in which the output voltage Vo is changed at a predetermined time or rate of change so as to then reach the target voltage Vref. Both the master unit MU and the slave units SU start to output power based on the trigger reception signal rTG.

In the master unit MU, after the inter-unit communication unit 32 transmits the control parameter Pr to all the slave units SU, the control unit 36 generates the trigger transmission signal sTG, and the synchronous processing unit 35 outputs the trigger signal to the isolated communication lines ZCL. The trigger transmission signal sTG is generated as a pulse signal having a predetermined width.

In the master unit MU and the slave units SU, when the pair of isolated communication lines ZCL conducts, the synchronous processing unit 35 generates the trigger reception signal rTG and outputs the trigger reception signal rTG to the control unit 36. The control unit 36 starts outputting the drive signal Dr based on the trigger reception signal rTG, and the power supply main circuit 30 starts to output power. The trigger reception signal rTG is a pulse signal similar to the trigger transmission signal sTG, and is delayed by a delay time tD after the trigger transmission signal sTG. The delay time tD is mainly a delay time of the photocouplers 51 and 52, and is on the order of several tens of microseconds. Therefore, the time is sufficiently shorter than the control cycle by the control unit 36, for example, 250 microseconds, and can be ignored.

Here, in a case where the output start command is transmitted between the power supply units 10 to 13 by digital communication via the inter-unit communication line UCL, the communication time becomes much longer than the delay time tD, and the communication time varies. Therefore, there is a problem that a significant deviation occurs in the output start timing of the power supply units 10 to 13, and the operation at the start of the output becomes unstable. In contrast, by quickly transmitting a trigger signal via the isolated communication lines ZCL, the start timings of the power supply outputs can be substantially synchronized, and the operation at the start of the output can be stabilized. In exactly the same manner, even in a case where the target value is changed during the output, the output change timing of the power supply units 10 to 13 can be substantially synchronized by transmitting the trigger signal via the isolated communication lines ZCL, and the operation at the time of the output change can be stabilized.

Furthermore, by transmitting the trigger signal in a conductive or non-conductive state, noise resistance can be improved and malfunction can be prevented. Further, the noise resistance can be further improved by interposing a photocoupler.

Note that, because the delay time tD of the photocouplers 51 and 52 is an extremely short time, the master unit MU is also capable of outputting the drive signal Dr based on the trigger transmission signal sTG instead of the trigger reception signal rTG.

(7) Operation at Start of Output

Figure 12:
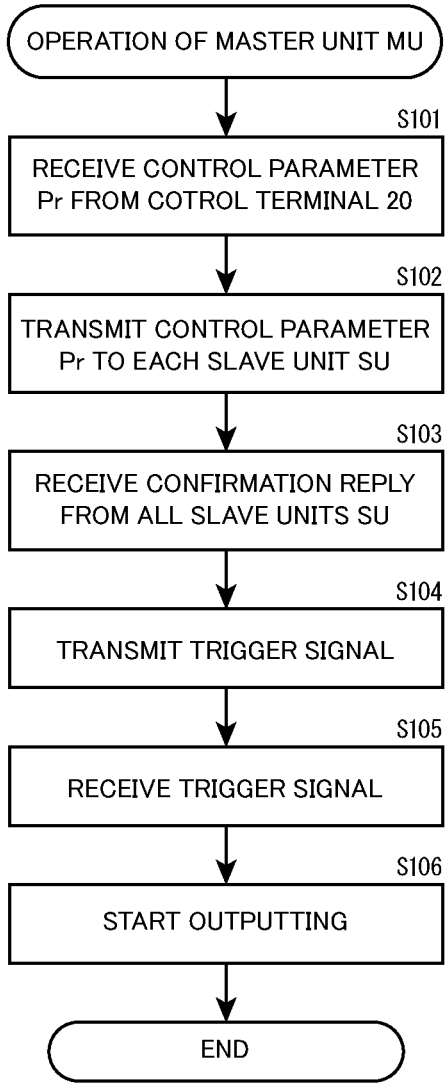
FIG. 12 is a flowchart showing an example of the operation of the master unit MU.

Steps S101 to S106 in FIG. 12 are a flowchart showing an example of the operation of the master unit MU. This flowchart is started by a data transmission request from the control terminal 20.

The terminal communication unit 31 receives the control parameter Pr from the control terminal 20 via the terminal communication line TCL (step S101). Among the received data, the control parameter Pr for the master unit is stored in the parameter storage unit 34, and the inter-unit communication unit 32 transmits the control parameter Pr for the slave units to each slave unit SU via the inter-unit communication line UCL (step S102). Each slave unit SU, having received the control parameter Pr, transmits a data reception confirmation reply to the master unit MU.

The inter-unit communication unit 32 receives the confirmation replies from each slave unit SU. After receiving a confirmation reply from all the slave units SU, the synchronous processing unit 35 transmits the trigger signal TG to the isolated communication lines ZCL (steps S103 and S104). When the synchronous processing unit 35 receives the trigger signal TG, the control unit 36 generates the drive signal Dr, and the power supply main circuit 30 starts outputting (steps S105 and S106).

Figure 13:
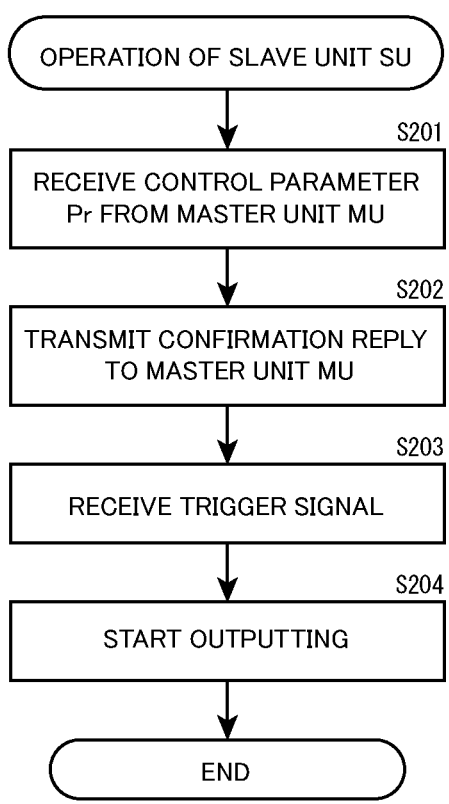
FIG. 13 is a flowchart showing an example of the operation of the slave units SU.

Steps S201 to S204 in FIG. 13 are a flowchart showing an example of the operation of the slave units SU. This flowchart is started by transmission of the control parameter Pr from the master unit MU.

The inter-unit communication unit 32 receives the control parameter Pr from the master unit MU (step S201). The received control parameter Pr is stored in the parameter storage unit 34, and a reception confirmation reply is transmitted to the master unit MU (step S202). Thereafter, when the synchronous processing unit 35 receives the trigger signal TG, the control unit 36 generates the drive signal Dr, and the power supply main circuit 30 starts outputting (steps S203 and S204).

Second Embodiment

In the above embodiment, an example of a power supply system 100 that transmits a trigger signal TG to start outputting power via the isolated communication lines ZCL has been described. In contrast, in the present embodiment, an example in which an error signal ER to stop outputting power is transmitted via the isolated communication lines ZCL will be described.

When the power supply system 100 is supplying power to the load 22, in a case where failure occurs in any of the two or more power supply units 10 to 13, for example in a case where an abnormal temperature rise is detected, an excessive load is applied to the other power supply units 10 to 13, and there is a risk of damage to the normal power supply units 10 to 13. For this reason, in a case where failure is found in any of the power supply units 10 to 13 that are outputting power, it is desirable to quickly stop the output operation of all the power supply units 10 to 13. Therefore, by using the isolated communication lines ZCL to transmit the error signal ER from the failed power supply unit 10 to 13 to the normal operating power supply units 10 to 13, the outputs of all the power supply units 10 to 13 are quickly stopped. The error signal ER is transmitted as a signal that is distinguishable from the trigger signal TG.

Figure 14:
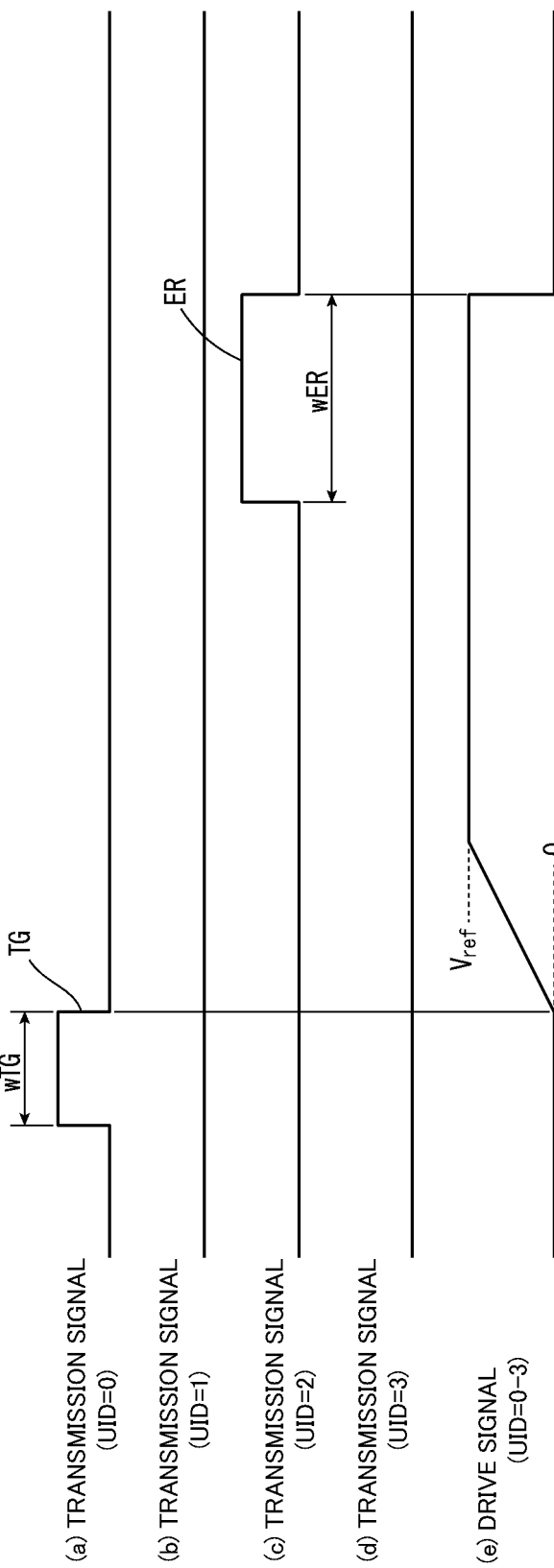
FIG. 14 is a timing chart showing an example of the operation of the power supply system 100 according to a second embodiment of the present invention.

FIG. 14 is a timing chart showing an example of the operation of the power supply system 100 according to a second embodiment of the present invention. (a) to (d) in FIG. 14 show signals transmitted by the synchronous processing unit 35 of the power supply units 10 to 13 to the isolated communication lines ZCL, and (e) shows the drive signals Dr of the power supply units 10 to 13. Because the configuration of the power supply system 100 is the same as the series-parallel CV setup of the four power supply units 10 to 13 shown in FIG. 9, redundant descriptions will be omitted.

The trigger signal TG is a signal transmitted only by the master unit MU, whereas the error signal ER is a signal that can be transmitted by any power supply unit 10 to 13, regardless of whether same is the master unit MU or a slave unit SU. In addition, the trigger signal TG is a signal to start outputting and is transmitted before outputting is started, whereas the error signal ER is a signal to stop outputting and is transmitted during outputting. The error signal ER is outputted as a signal which is distinguishable from the trigger signal.

The trigger signal TG and the error signal ER are distinguished by affording the signals different signal output times. For example, the pulse width wER of the error signal ER is longer than the pulse width wTG of the trigger signal TG, and in a case where any signal is outputted on the isolated communication lines ZCL, it is possible to discriminate, based on the signal duration, whether the signal is the trigger signal TG or the error signal ER.

In a case where the master unit MU (UID=0) outputs the trigger signal TG, each slave unit SU (UID=1 to 3) is capable of discriminating that the signal is the trigger signal TG because the signal duration is wTG, and the control unit 36 of each power supply unit 10 to 13 generates the drive signal Dr, and power output is started.

In a case where failure occurs in the slave unit SU (UID=2) which is outputting power, an error signal is outputted from the power supply unit 13. Because the duration of this signal is wER, it is possible to discriminate that this signal is the error signal ER, and the control unit 36 of each power supply unit 10 to 13 stops generating the drive signal Dr, and the power output stops.

Figure 15:
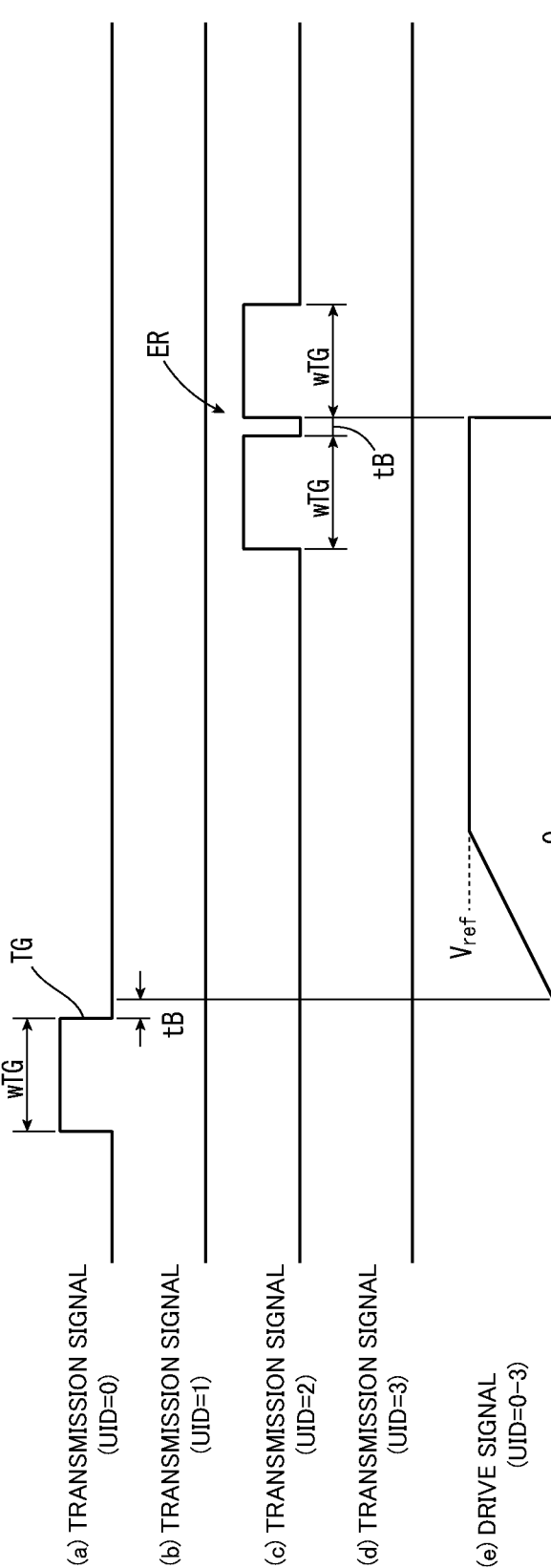
FIG. 15 is a timing chart showing another example of the operation of the power supply system 100 according to the second embodiment of the present invention.

FIG. 15 is a timing chart showing another example of the operation of the power supply system 100 according to the second embodiment of the present invention. (a) to (d) in FIG. 15 show signals transmitted by the synchronous processing unit 35 of the power supply units 10 to 13 to the isolated communication lines ZCL, and (e) shows the drive signals Dr of the power supply units 10 to 13.

The trigger signal TG and the error signal ER are distinguished from each other by affording same different numbers of times the pulse signals are continuously outputted. For example, although the widths of the pulse signals constituting the trigger signal TG and the error signal ER are the same, the trigger signal TG is a single pulse transmitted at sufficient time intervals, whereas the error signal ER is continuously outputted with two pulse signals sandwiching a short interval time tB.

The power supply units 10 to 13 which receive the trigger signal TG and the error signal ER are capable of discriminating, after detecting one pulse signal, and after the interval time tB has elapsed, whether the signal is the trigger signal TG or the error signal ER.

According to the present embodiment, not only the trigger signal TG but also the error signal can be transmitted via the isolated communication lines ZCL. Therefore, in a case where any of the power supply units 10 to 13 fails, the outputs of all the power supply units can be quickly stopped, and damage to the normal power supply units can be prevented. Moreover, the error signal ER can be realized at low cost by being transmitted between the power supply units 10 to 13 as a signal that can be distinguished from the trigger signal TG.

DESCRIPTION OF REFERENCE NUMERALS

100 power supply system
10 to 13 power supply unit
20 control terminal
21 AC power
22 load
30 power supply main circuit
301 voltage detection unit
302 current detection unit
31 terminal communication unit
32 inter-unit communication unit
33 PWM drive unit
34 parameter storage unit
35 synchronous processing unit
36 control unit
41 isolation transformer
412 transformer
421 switching circuit
422 inductance
42 step-up/down DC/DC converter
51 transmission photocoupler
52 reception photocoupler
61 PI processing
62 balance adjustment processing
65 balance adjustment processing
Aj adjustment amount
Bi balance information
Pr control parameter
Cm operation mode information
Cr target value
Cb balance adjustment target information
Dr drive signal
Idet detected current
Idif difference
Io output current
Iref target current
Vdet detected voltage
Vdif difference
Vo output voltage
Vref target voltage
MU master unit
SU slave unit
TCL terminal communication line
UCL inter-unit communication line
ZCL isolated communication line
TG trigger signal
rTG trigger reception signal
sTG trigger transmission signal
ER error signal

The invention claimed is:

1. A power supply system that includes two or more optionally connectable power supply units, the power supply units cooperating to supply DC power to a shared load, wherein each of the power supply units includes:

a power supply main circuit that converts AC power supplied from a power grid into DC power;

a current detection unit that detects an output current;

a voltage detection unit that detects an output voltage;

a parameter storage unit that rewritably holds, as a target value, operation mode information selectively indicating constant current mode or constant voltage mode, and one of a target current or a target voltage, whichever corresponds to the operation mode information;

a control unit that controls the power supply main circuit such that one of the output current or the output voltage, whichever corresponds to the operation mode information, matches the target value;

a balance information transmission unit that transmits, as balance information, the output voltage when the operation mode information indicates the constant current mode in case of series connection of the power supply units and the output current when the operation mode information indicates the constant voltage mode in case of parallel connection of the power supply units; and a balance information reception unit that receives, as balance information, the output voltage when the operation mode information indicates the constant current mode in case of series connection of the power supply units and the output current when the operation mode information indicates the constant voltage mode in case of parallel connection of the power supply units from another one of the power supply units, and wherein the control unit performs balance adjustment with the another power supply unit by controlling the power supply main circuit to operate from beginning to end of the balance adjustment in either the constant current mode or the constant voltage mode indicated by the balance information of an own unit and the another power supply unit based on a difference between the output voltage of the own unit and an average of the output voltage of the another power supply unit in case of the constant current mode and a difference between the output current of the own unit and an average of the output current of the another power supply unit in case of the constant voltage mode.

2. The power supply system according to claim 1, wherein the parameter storage unit rewritably holds balance adjustment target information for identifying the another power supply unit serving as a reference target for balance adjustment, wherein the balance information transmission unit transmits balance information on the own unit to an inter-unit communication line of a bus communication type, and wherein the balance information reception unit selectively receives the balance information from the inter-unit communication line based on the balance adjustment target information.

3. The power supply system according to claim 2, wherein another power supply unit connected in series to the own unit is set as the reference target for the balance adjustment during the constant current mode, whereas, during the constant voltage mode, another power supply unit connected in parallel to the own unit is set as the reference target for the balance adjustment.

4. The power supply system according to claim 2, wherein the balance adjustment target information is generated by a control terminal based on a user operation and transmitted to the power supply units.

5. A power supply unit connected in series or in parallel with another power supply unit, the power supply unit cooperating with the another power supply unit to supply DC power to a shared load, the power supply unit comprising:

a power supply main circuit that converts AC power supplied from a power grid into DC power;

a current detection unit that detects an output current;

a voltage detection unit that detects an output voltage;

a parameter storage unit that rewritably holds, as a target value, operation mode information selectively indicating constant current mode or constant voltage mode, and one of a target current or a target voltage, whichever corresponds to the operation mode information;

a control unit that controls the power supply main circuit such that one of the output current or the output voltage, whichever corresponds to the operation mode information, matches the target value;

a balance information transmission unit that, as balance information, the output voltage when the operation mode information indicates the constant current mode in case of series connection of the power supply unit and the another power supply unit and the output current when the operation mode information indicates the constant voltage mode in case of parallel connection of the power supply unit and the another power supply unit; and a balance information reception unit that receives, as balance information, the output voltage when the operation mode information indicates the constant current mode in case of series connection of the power supply unit and the another power supply unit and the output current when the operation mode information indicates the constant voltage mode in case of parallel connection of the power supply unit and the another power supply unit, from the another power supply unit, and wherein the control unit performs balance adjustment with the another power supply unit by controlling the power supply main circuit to operate from beginning to end of the balance adjustment in either the constant current mode or the constant voltage mode indicated by the balance information of an own unit and the another power supply unit based on a difference between the output voltage of the own unit and an average of the output voltage of the another power supply unit in case of the constant current mode and a difference between the output current of the own unit and an average of the output current of the another power supply unit in case of the constant voltage mode.

* * * * *